United States Patent
Sirevaag et al.

(10) Patent No.: US 11,143,016 B2
(45) Date of Patent: Oct. 12, 2021

(54) METHOD FOR EVALUATING A MATERIAL ON A REMOTE SIDE OF A PARTITION USING ULTRASONIC MEASUREMENTS

(71) Applicant: Equanostic AS, Oslo (NO)

(72) Inventors: Tore Lie Sirevaag, Oslo (NO); Tonni Franke Johansen, Trondheim (NO)

(73) Assignee: Equanostic AS, Oslo (NO)

( * ) Notice: Subject to any disclaimer, the term of this patent is extended or adjusted under 35 U.S.C. 154(b) by 0 days.

(21) Appl. No.: 17/090,031

(22) Filed: Nov. 5, 2020

(65) Prior Publication Data

US 2021/0140302 A1 May 13, 2021

(30) Foreign Application Priority Data

Nov. 7, 2019 (GB) .................................... 1916209.8

(51) Int. Cl.
*E21B 47/00* (2012.01)
*E21B 47/005* (2012.01)
*G01V 1/50* (2006.01)

(52) U.S. Cl.
CPC .............. *E21B 47/005* (2020.05); *G01V 1/50* (2013.01); *G01V 2210/6242* (2013.01)

(58) Field of Classification Search
CPC . E21B 47/005; G01V 1/50; G01V 2210/6242
See application file for complete search history.

(56) References Cited

U.S. PATENT DOCUMENTS

| 9,534,487 | B2* | 1/2017 | Zeroug | ................. E21B 47/005 |
| 10,138,727 | B2 | 11/2018 | Zeroug et al. | |
| 2006/0198243 | A1* | 9/2006 | Tang | ..................... E21B 47/005 367/35 |
| 2015/0218930 | A1 | 8/2015 | Zeroug et al. | |
| 2016/0209539 | A1* | 7/2016 | Le Calvez | ............... G01V 1/50 |

OTHER PUBLICATIONS

Examination Report in United Kingdom Patent Application No. GB1916209.8 dated Oct. 20, 2020, 1 page.
(Continued)

*Primary Examiner* — Krystine E Breier
(74) *Attorney, Agent, or Firm* — Smith Baluch LLP

(57) ABSTRACT

Methods are disclosed for evaluating a material on a remote side of a partition separating first and second domains wherein flexural waves within the partition are received by spaced-apart ultrasonic receivers and processed to determine the velocity of the waves propagating into the second domain from a first receiver to a second receiver located more remote from the transmitter than the first receiver and whose separation from the first receiver is known. Comparison of a theoretical phase velocity with the measured phase velocity of the recorded waves allows determination as to whether the flexural wave is propagating through solid. This may be based on a measurable deviation between the two curves occurring at a critical frequency, which may be identified by a perturbation in a group velocity plot. Discrimination may also be based on the gradient of a straight line that best-fits the attention dispersion of the frequency spectrum.

11 Claims, 9 Drawing Sheets

(56) References Cited

OTHER PUBLICATIONS

He et al., "Ultrasonic leaky flexural waves in multilayered media: Cement bond detection for cased wellbores." Geophysics 79.2 (2014): A7-A11. 5 pages.
Response to Search Report and Written Opinion filed in United Kingdom Patent Application No. GB1916209.8 dated Aug. 28, 2020. 3 pages.
Search Report and Written Opinion and Cover Letter in United Kingdom Patent Application No. GB1916209.8 dated Aug. 10, 2020, 10 pages.
Viggen et al., "Analysis of outer-casing echoes in simulations of ultrasonic pulse-echo through-tubing logging." Geophysics 81.6 (2016): D679-D685. 7 pages.
Viggen et al., "Simulation and modeling of ultrasonic pitch-catch through-tubing logging." Geophysics 81.4 (2016): D383-D393. 12 pages.
Zeroug et al., "Ultrasonic leaky-Lamb wave imaging through a highly contrasting layer." IEEE Symposium on Ultrasonics, 2003. Vol. 1. IEEE, 2003. 5 pages.
Li et al., "Natural beam focusing of non-axisymmetric guided waves in large-diameter pipes." Ultrasonics 44.1 (2006): 35-45.
Nelson, "A universal dispersion curve for flexural wave propagation in plates and bars." Journal of Sound and Vibration 18.1 (1971): 93-100.
Rose et al., "Ultrasonic Waves in Solid Media." ASAJ 107.4 (2000): 1807-1808.
Search Report and Written Opinion in United Kingdom Patent Application No. GB1916209.8 dated Aug. 5, 2020, 7 pages.
Sirevaag, Ultrasonic borehole logging: Expanding the processing of the ultrasonic measurements to improve the evaluation of logging behind the casing. PhD thesis Norwegian University of Science and Technology (NTNU) 2019. 164 pages.
Van Kuijk et al., "A novel ultrasonic cased-hole imager for enhanced cement evaluation." International petroleum technology conference. International Petroleum Technology Conference, 2005. 14 pages.
Velichko et al., "Excitation and scattering of guided waves: Relationships between solutions for plates and pipes." The Journal of the Acoustical Society of America 125.6 (2009): 3623-3631.
Zeroug et al., "Ultrasonic leaky-Lamb wave imaging through a highly contrasting layer." IEEE Symposium on Ultrasonics, 2003. vol. 1. IEEE, 2003. Abstract only. 3 pages.

* cited by examiner

METHOD FOR EVALUATING A MATERIAL
ON A REMOTE SIDE OF A PARTITION
USING ULTRASONIC MEASUREMENTS

CROSS-REFERENCE TO RELATED APPLICATION(S)

This application claims priority to UK Application No. 1916209.8, which was filed on Nov. 7, 2019, and is incorporated herein by reference in its entirety.

FIELD OF THE INVENTION

The present invention relates to evaluating a material on one side of a partition using acoustic measurements.

PRIOR ART

Prior art references considered to be relevant as a background to the invention are listed below and their contents are incorporated herein by reference. Acknowledgement of the references herein is not to be inferred as meaning that these are in any way relevant to the patentability of the invention disclosed herein. Each reference is identified by a number enclosed in square brackets and accordingly the prior art will be referred to throughout the specification by numbers enclosed in square brackets.
[1] Li, J. and J. L. Rose (2006): *Natural beam focusing of non-axisymmetric guided waves in large-diameter pipes*. Ultrasonics 44(1): 35-45.
[2] Viktorov, I. A: *Rayleigh and Lamb waves: physical theory and applications*. New York, Plenum Press (1967).
[3] Rose, J. L: *Ultrasonic Waves in Solid Media* (2000) 107(4): 1807-1808.
[4] Nelson, H. M: *A universal dispersion curve for flexural wave propagation in plates and bars*. Journal of Sound and Vibration (1971), 18(1), 93-100.
[5] Sirevaag, T. PhD thesis shortly to be submitted to Norwegian University of Science and Technology (NTNU).
[6] van Kuijk, R., S. Zeroug, B. Froelich, M. Allouche, S. Bose, D. Miller, J.-L. Le Calvez, V. Schoepf and A. Pagnin: *A Novel Ultrasonic Cased-Hole Imager for Enhanced Cement Evaluation*, International Petroleum Technology Conference (2005).
[7] Zeroug, S., Yang, J. & Bose, S. U.S. Pat. No. 9,534,487 Cement acoustic properties from ultrasonic signal amplitude dispersions in cased wells.
[8] Velichko, A: *Excitation and scattering of guided waves: relationships between solutions for plates and pipes*, J Acoust Soc Am. 2009 June; 125(6):3623-31. doi: 10.1121/1.3117441.

BACKGROUND

Oil wells are created by drilling a hole into the earth with a drilling rig that rotates a drill string with a bit attached. After the hole is drilled to a prescribed depth, sections of steel tubing known as casing are set in the hole (slightly smaller than the borehole). The small space between the formation and the casing is cemented in order to prevent oil and gas migrating up to the surface. During the drilling, completion and permanent closure of an oil well, it is a challenge to verify if the cement has been squeezed up the annulus and has bonded properly to the casing. If no pressure test is planned, the primary method to validate that the annulus is impermeable, is to use ultrasonic borehole logging. To improve the identification of whether an impermeable solid is bonding onto the casing, efforts have been made to provide solutions for using ultrasonic logging in the field.

US2006198243 discloses a method and apparatus for determining the integrity of a cement bond log disposed in the annular space between a casing and a wellbore. The method and apparatus induce a Lamb wave in the casing and into the wellbore. The Lamb wave attenuates upon passage through the cement bond. The integrity of the cement bond log can be determined by analysis and evaluation of the attenuation results.

U.S. Pat. No. 9,534,487 [7] uses a transmitter and a number of receivers to measure zero-order mode ($A_0$) anti-symmetric flexural Lamb waveforms. These are processed to obtain the amplitude attenuation dispersion plot and phase dispersion plot as functions of frequency as means to characterize the physical state of a casing and annular fill outside the casing. The flexural attenuation technique obtains information by transmitting a pressure wave ($T_1$) with oblique incidence at the casing wall that excites a guided wave propagating upwards in the casing. The guided wave leaks off energy as it propagates, and the leaked off pressure wavefront is measured at receivers positioned further up the well. Since the flexural wave leaks energy as it propagates, the wave is constantly attenuated as the distance increases.

U.S. Pat. No. 9,534,487 also notes that a perturbation in the ultrasonic pitch-catch measurements may appear under a certain condition. Further, perturbations of the estimated dispersion information across depth zones or azimuthal ranges can be related to cement defects such as contamination by mud, cracking, as well as the existence of channels that may permit hydraulic channeling. The cement wavespeeds are chosen such that there is a discontinuity in the flexural wave attenuation dispersion curve. The estimated value, $V_o$, around 2,600 m/s, corresponds to the bulk wavespeed of the cement in the annulus between casing and formation. Regardless of whether it is compressional or shear wavespeed, at around 2,600 m/s the value indicates the content of the annulus is made of a solid. The ultrasonic waveforms are processed to obtain (i) an amplitude attenuation dispersion plot of attenuation as a function of frequency and (ii) a phase dispersion plot of phase velocity as a function of frequency. Barrier wave-speeds are determined by identifying discontinuities within the amplitude attenuation dispersion plot, which are then related to the discontinuities to barrier wavespeeds using the phase dispersion plot.

U.S. Pat. No. 10,138,727 processes zero-order mode antisymmetric Lamb flexural waveforms to identify barrier parameters as a function of azimuth and depth along the borehole, wherein the waveforms comprise at least two of sonic signals, ultrasonic pulse-echo signals, and ultrasonic pitch-catch signals.

SUMMARY OF THE INVENTION

In accordance with the invention there are provided methods for evaluating a material on a remote side of a partition having the features of the independent claims.

The present invention differs from known approaches such as disclosed in [7] in determining a theoretical phase velocity of the flexural wave propagating through a domain on a side of the partition remote from the transducers. Comparison of the theoretical phase velocity with the measured phase velocity of the recorded waves allows determination as to whether the flexural wave is propagating through solid. A further feature of the invention is that the perturbation is more easily measured when calculating and plotting the group velocity of the flexural wave (pulse) as a function of frequency. Thus, an embodiment of the present invention estimates the frequency where the perturbation occurs in the group velocity plot and then uses an analytical solution, such as described in [4] Nelson, H. M. (1971) to find the velocity as that frequency and relate this velocity to the velocity in the material outside the casing. In yet another embodiment, instead of looking for a discontinuity in the attenuation dispersion plot, the invention quantifies the frequency dependence of the attenuation over a predefined interval as will be discussed below.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
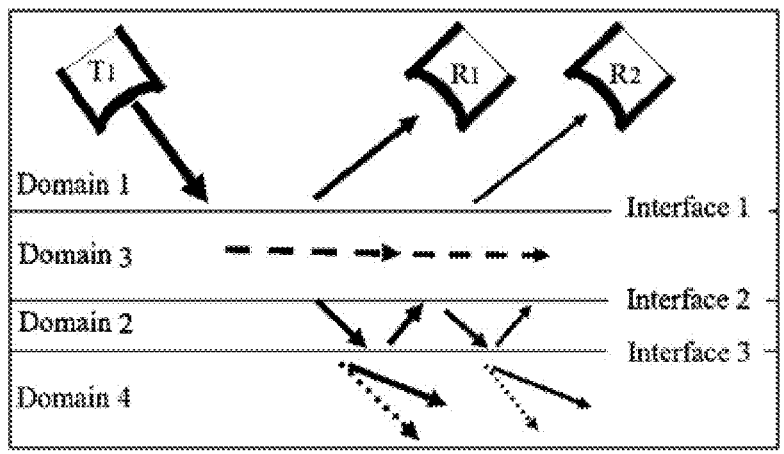
FIG. 1 shows schematically a measuring method and system for characterizing the physical state of a partition installed in a borehole.

FIG. 1 shows schematically a measuring method and system according to an embodiment of the invention for characterizing the physical state of a partition installed in a borehole. The partition is constituted by the wall of a pipe known as a "casing" that is installed in a borehole, thus separating a first domain inside the casing from a second domain outside the casing. The casing is surrounded by solid geological formation, which in the case of an oil or gas well is typically the sea bed. The casing usually comprises multiple sections of progressively narrower bore the deeper they are inserted into the geological formation. After installation of each section of casing, it is cemented inside the borehole so as to form a secure rigid enclosure around the casing, which serves as a conduit for accommodating the drill and releasing the oil or gas through perforations made in the portion of the casing which passes through the production zone, to provide a path for the oil to flow from the surrounding rock into the production tubing. Thus, with reference to FIG. 1 it is possible to define four domains as follows:

Domain 1 is the hollow space inside the casing;

Domain 2 is the annular space between the outer wall of the casing and the formation. If there is no annular space, i.e. the formation is bonded onto the casing, Domain 2 will vanish; and Domain 3 is the wall, which constitutes a partition between the formation and the first domain. In an oil well the partition refers to a casing which is a larger pipe that is assembled and inserted into the recently drilled section of the borehole;

Domain 4 is the geological formation.

We will refer to these four domains as first, second, third and fourth domains, respectively.

At least one transmitter $T_1$ is positioned inside the casing, where the transmitted signal propagates and hits the wall of the casing at an oblique incidence. The transmitted signal excites a guided wave inside the wall of the casing formed of a known material and having a known thickness.

From theory, a transducer positioned at an angle inside a liquid-filled pipe can excite guided waves that are similar to Lamb waves. The diameter, $d_c$, and the thickness, $t_c$, of the cylindrical pipe determine the deviation between the guided waves and the Lamb waves. If the ratio $d_c/t_c$ is above 10, which is typically the case in the field, the difference is negligible [1]. The similarity also depends on the frequency, but if the wavelength of the guided wave is much less than the pipe circumference and $d_c/t_c$ is greater than 10, the effect of the curvature becomes insignificant [8].

Figure 2:
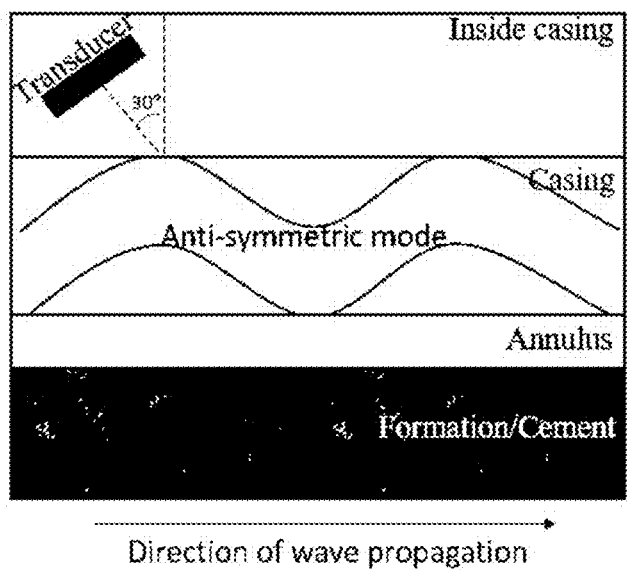
FIG. 2 shows schematically the orientation of the transducer with respect to the partition.

The well geometry can be understood in two dimensional spatial coordinates, where the length of the partition is the axial direction and the azimuthal direction is simplified as only one direction. Further, in the frequency regime of interest, the two zero-order modes dominate the propagating wave in the partition. The zero-order symmetric mode ($S_0$) referred to as the extensional wave, has an elliptical particle displacement that is mainly parallel to the casing, i.e. in the axial direction. The displacement of the zero-order antisymmetric mode ($A_0$), has an elliptical particle-motion mainly perpendicular to the partition, i.e. a 'bending' or 'flexural' motion. Thus, the particle motion in the casing is elliptical, with the vertex pointing in the direction of the surrounding material, resulting in waves being emitted from each side of the casing, enabling Domain 2 to be investigated. The excitation of $A_0$ at the pipe/plate requires an oblique incidence angle around 30° if Domain 1 is filled with water and Domain 3 is made of steel. This is illustrated in FIG. 2.

The system also requires at least two receivers, as seen in FIG. 1, as $R_1$ and $R_2$, both of which are located in Domain 1 and oriented in mirror symmetry to the transducer relative to a line normal to the outer surface of the casing at an angle of reflection that is equal to the incidence angle of the transducer. The flexural wave leaks off energy as it propagates, and the leaked off pressure wavefront is measured at receivers positioned further up the well. Since the flexural wave leaks energy as it propagates, the wave is being constantly attenuated as the distance increases. The materials on both sides of the casing i.e. in Domains 1 and 2 affect the attenuation. Assuming the material inside Domain 1 is known, measuring the attenuation from one receiver to the next provides information about the acoustic properties of the material constituting the annular space (Domain 2).

Figure 3:
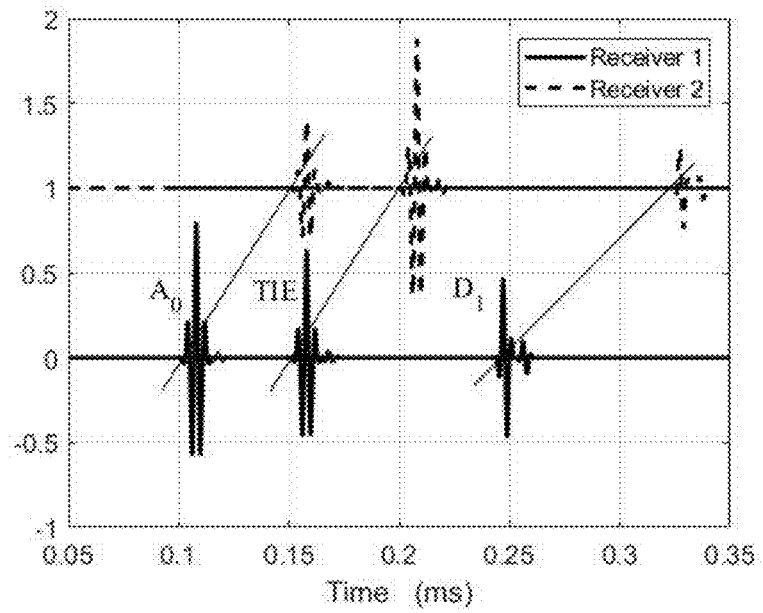
FIG. 3 shows graphically idealized waveforms from ultrasonic pitch-catch measurements with the transducer directed to the partition at an angle of incidence to the normal of approximately 30°.

FIG. 3 shows graphically expected, idealized waveforms from flexural logging in the field and illustrates the effect of a liquid filled annulus (Domain 2), where the first waveform is from $R_1$ and the second waveform is from $R_2$, as shown in FIG. 1. The first distinct pulse is the arrival of the emitted wavefront from the flexural wave ($A_0$). In the second waveform one can see the pulse has been attenuated, and the loss between the receivers gives an indication of what type of material is in contact with the casing. The second amplitude seen in the waveforms is a result of the wavefront being reflected back at the interface between Domains 2 and 4. This pulse is often referred to as the third interface echo (TIE), where the first interface echo is between Domains 1 and 3, and the second interface echo is between Domains 2 and 3.

As the flexural wave propagates along the casing, waves are constantly being leaked off, and the waves being reflected at the third interface generate a secondary zero-order flexural wave $A_0$ in the casing, marked as TIE in FIG. 3. Successive waves reflected at the third interface combine to produce a strong cumulative amplitude, and therefore, the measured amplitude of the TIE can be larger for the second waveform than for the first as is shown in FIG. 3. The third amplitude is the direct wave ($D_1$), or liquid borne waves, thus travelling slower than the other pulses. This is seen in the figure, where the time difference between the arrivals of the direct wave increases compared to the leaked off wavefront.

For the flexural wave to radiate longitudinal or pressure waves, commonly referred to as P-waves into the surroundings, the P-wave velocity of the annulus material ($v_{p,a}$) needs to be lower than the dispersive phase velocity of the flexural wave ($v_{A,\varphi}$), as described in [6]. If Domain 2 is a solid, the evaluation tends to be slightly more complex. $v_{p,a}$ for a solid often overlaps or is higher than the dispersive $v_{A,\varphi}$ (while this can also happen with a fluid, it is less common). This will cause the radiation into the solid material to reduce drastically, and the velocity at which the two velocities are equal is referred to as the critical velocity.

Figures 4A, 4B:
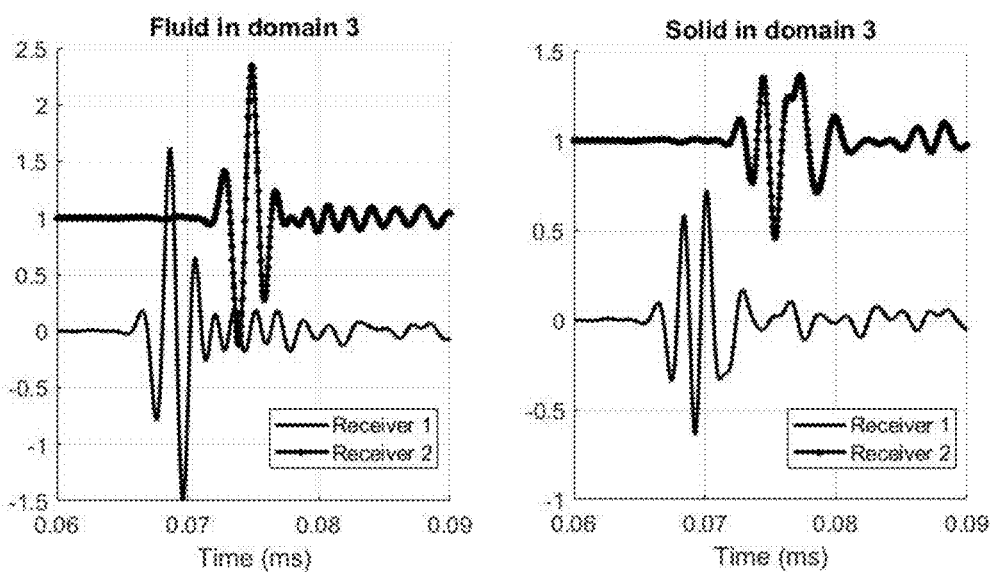
FIGS. 4a and 4b are graphical representations showing the flexural pulse when the annulus is filled with a liquid or solid, respectively.

FIGS. 4a and 4b show graphically the flexural pulse when the annulus is filled with a fluid or solid, respectively. The waveforms are field data from an oil well at the Utsira High area in the North Sea using a commercial tool optimized for ultrasonic borehole logging. The waveforms where domain 2 is filled with a fluid is picked from a section way above the casing shoe. The casing shoe is the terminology used to indicate the bottom of the casing, and the field data presented are from a section more than 400 meters above, so it is nearly physically impossible that cement has been squeezed up that far. Therefore, the annulus is almost certainly filled with a combination of the drilling mud used to drill out that section and the formation fluid in the pores. The waveforms where domain 2 is filled with a solid is picked just above the casing shoe. The cement used in this oil well was foam cement, a cement type mixed with nitrogen that makes it light and results in a velocity between 2300-2700 m/s.

It is seen that the nicely preserved flexural pulse seen in FIG. 4a becomes partially obliterated as shown in FIG. 4b when a solid material is in contact with the casing. As described in [5] and [7], the modification of the pulse is believed to happen during the transition from a leaky-Lamb wave ($v_{p,a} < v_{A_0,\varphi}$) to an evanescent wave ($v_{p,a} > v_{A_0,\varphi}$). Snell's law estimates the refraction angle for a plane wave passing through a boundary between two different isotropic media. If the velocity of the propagating wave is below the velocity in the surrounding medium, the outgoing angle can be greater than 90° depending on the angle of incidence. In this case, the plane wave is reflected and no energy is transmitted into the medium outside. It would thus appear that since the flexural wave has an elliptical particle-motion that is mainly perpendicular to the plane, the angle of incidence at the interface will vary. Evanescent waves are formed when sinusoidal waves are leaked off a plate at a greater angle than the critical angle, which would imply that the radiation at the interface is reduced. The wave that is leaked off into the annulus material is a P-wave, while the evanescent wave decays exponentially with the distance from the interface between the casing and the annulus material.

The transition causes the modification of the pulse. It is believed that a P-wave is excited in the annulus material and propagates parallel with the casing with almost the same velocity as $v_{A_0,\varphi}$. The P-wave will leak off energy into the casing, creating a second mode that has its energy at the frequency where the dispersive $v_{A_0,\varphi} \approx v_{P,a}$. The two modes will arrive at the receivers almost at the same time; hence the pulse seems to be smeared out. Furthermore, since the deviation occurs where the P-wave velocity intersects the phase velocity, processing in the frequency domain can be used to estimate $v_{a,P}$.

Figure 5A:
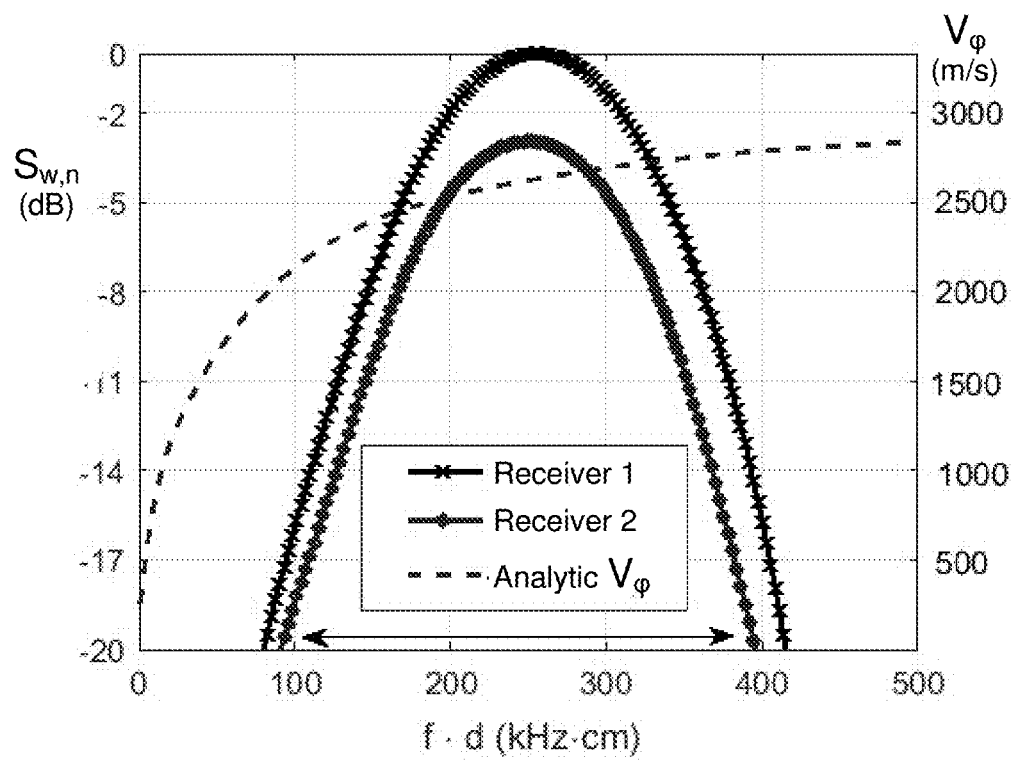
FIGS. 5a and 5b are graphical representations showing respectively the frequency spectrum of the flexural pulse and the accompanied phase velocity between the spectra.
Figure 5B:
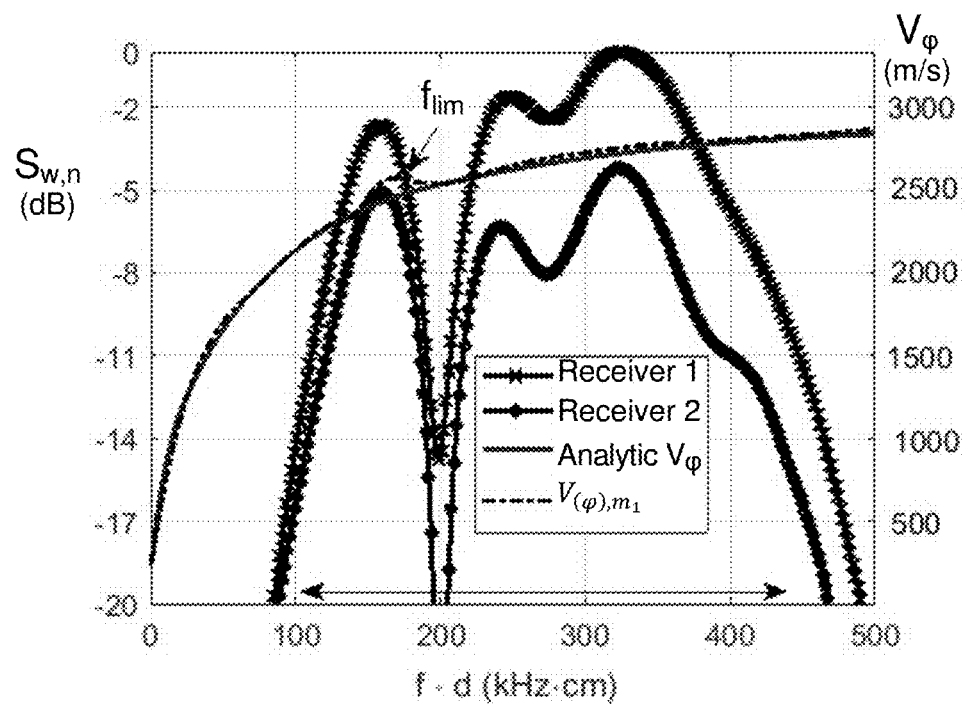

By picking the pulse that originated from $A_0$ in the two receivers' waveforms (see FIG. 3) and performing a Fourier transform, one can analyze the pulse in the frequency domain as seen in FIG. 5. The frequency spectra in FIG. 5a are for the liquid from FIG. 4 and the frequency spectra in FIG. 5b are for the solid. One can see the two receivers $R_1$ and $R_2$ provide similar measurements but with different signal strengths.

Since $v_{A,\varphi}$ is dispersive, the intersection with $v_{p,a}$, can happen over a wider range of frequencies, but the effect is detectable only if sufficiently amount of energy lies in the frequency spectrum ($S_{w,n}$) where the P-wave and phase velocity overlap. The notation w is the waveform, and n is a number indicating which receiver/distance. This is demonstrated in FIGS. 5a and 5b, where the logarithmic, normalized frequency spectra of the flexural wave measured at $R_1$ and $R_2$ are represented by the solid and dashed curves respectively. The frequency spectra in FIGS. 5a and 5b are from the same field data as presented in FIGS. 4a and 4b, respectively. The data demonstrates that the energy in the flexural wave lies within a certain bandwidth. The horizontal axis is the frequency (f) multiplied by the casing thickness (d), which makes it easy to compare the different scales if the ratio f·d remains constant [3].

The chain-dotted black curve in FIG. 5a is an analytical solution as described by Nelson [4], to calculate the dispersion curve for the flexural wave in casing material using the same plate Poisson's ratio, plate shear velocity, plate thickness and target frequency as in the measured data. The vertical axis to the right shows the phase velocity of the flexural wave. For the sake of clarification, it should be noted that FIGS. 5a and 5b each show two separate curves on a common abscissa but against different ordinates. Thus, the calculated wave velocity measured in units of m/s is plotted against the right-hand vertical axis, while the measured phase velocity amplitude measured in units of dB is plotted against the left-hand vertical axis.

The same type of plot was generated in FIG. 5b for a synthetic light solid, but here the phase velocity is also computed from the measured data to compare to the analytical solution. By selecting the pulses that originate from the flexural wave in the two receivers' waveforms, performing Fourier transforms, and measuring the phase angle in the interval for each element of the complex signal in the frequency domain, one can find the phase shift $\Delta\varphi$ between the pulses. The phase shift between the pulses can also be expressed as:

$$\Delta\varphi = \omega(t_1 - z_1/v_{A_0,\varphi}) - \omega(t_2 - z_2/v_{A_0,\varphi}) \quad (1)$$

where $\omega$ is the angular frequency, $t_j$ is the time of the selection of the first and second waveform, $z_j$ gives the positions of the receivers, and $v_{A_0,\varphi}$ is the flexural phase velocity presented earlier. Since $\Delta\varphi$ is already calculated from the arrival time, one can rearrange Eq. (1) and solve it to find $v_{A_0,\varphi}$.

Figure 6A:
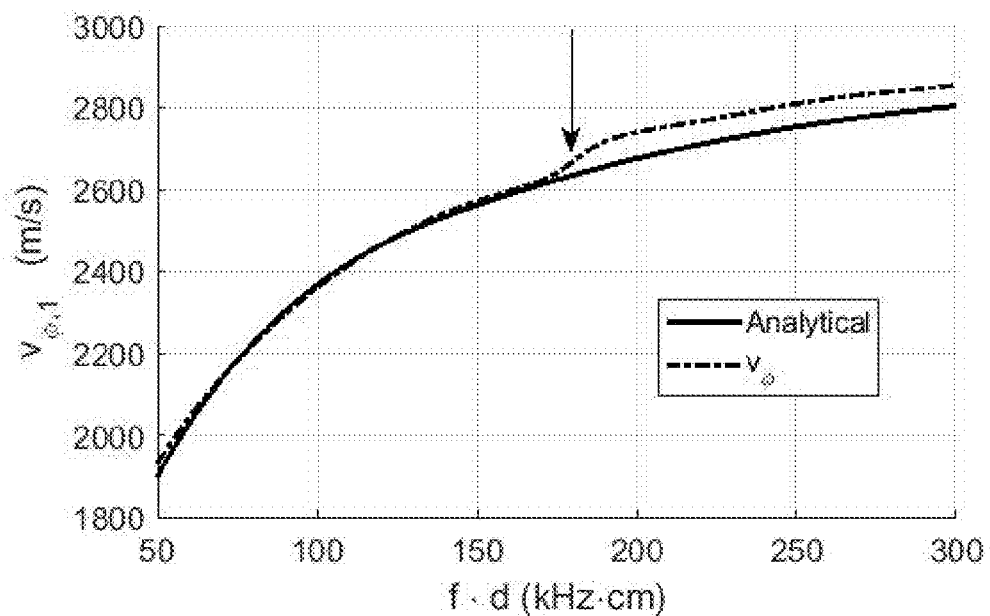
FIGS. 6a and 6b are graphical representations showing respectively the phase velocity and group velocity in the frequency domain highlighting the perturbation from the group velocity according to the invention.

As is seen from FIG. 5b there is an anomaly in the measurements at about 175 kHz·cm, which is shown more clearly in FIG. 6a over a narrow range of wavespeed at enlarged scale. It is seen that for the specific foam cement in contact with the casing for which these results were derived, up to this critical frequency, denoted as $f_{lim}$, the analytical curve follows almost exactly the estimated phase velocity. However, at $f_{lim}$ there is a slight deviation between the two curves, which then remain substantially parallel. It is known from [7] that a perturbation occurs when the flexural phase velocity overlaps the P-wave velocity of the annulus material. The inventors have found surprisingly that, the velocity at $f_{lim}$ in the analytical solution can be related to the velocity in Domain 2. The P-wave velocity in Domain 2 can be found by reading off the velocity of $v_{A_0,\varphi}$ at $f_{lim}$. The wave velocity through a material is characteristic, and thus a good indication of the type of material present at the opposite side of the casing wall.

It should be noted that the deviation providing the critical frequency can only be found within the frequency range where the signal strength is sufficient. This range is typically between 2000 m/s to 2900 m/s. So, detecting a deviation is indicative of the material being a solid. If no deviation is observed, we cannot say if it is a solid or liquid, just that the velocity of the material behind the casing is not between 2000 m/s-2900 m/s.

The exact form of deviation may vary for different solid materials. Thus, for some materials the two curves may not follow each other prior to the critical frequency. Likewise, there may be materials where the deviation is not sufficiently defined in the phase velocity plot to allow direct determination of the critical frequency. However, for those phase velocity plots where it is possible to determine the critical frequency directly, the corresponding phase velocity at the critical frequency $f_{lim}$ is compared to a predetermined threshold to determine if the space contains a liquid or a solid.

Alternatively, the invention provides a complementary technique to determining the critical frequency $f_{lim}$ at which a deviation occurs, which obviates the need to determine the critical frequency directly from the phase velocity plot. To this end, it has been found that the perturbation is far more pronounced when the group velocity is plotted against frequency as will now be described.

Figure 6B:
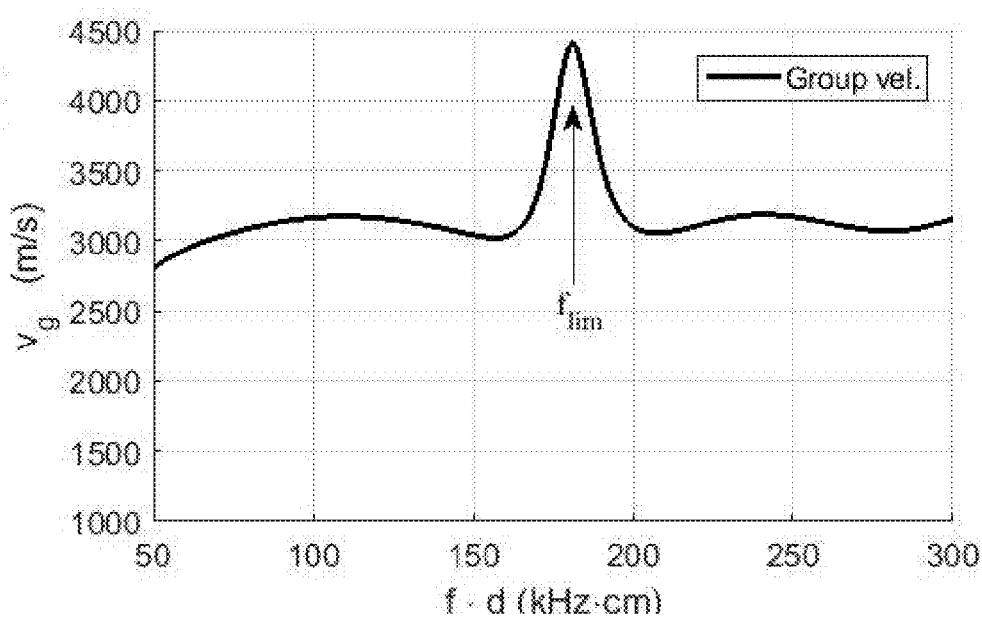

The analytical solution and $v_{A_0,\varphi}$ seen in FIG. 5b are presented in FIG. 6a together with the group velocity of the flexural wave ($v_{A,g}$) in FIG. 6b. In general, for the phase velocity $v_\varphi = \omega/k$ and the group velocity $v_g = d\omega/dk$, estimation of the group velocity involves taking the derivative of the measured phase velocity. Because the deviation in the phase velocity in FIG. 6a is small, it is difficult to use the phase dispersion curves to detect $f_{lim}$. Instead, a good practice would be to find $f_{lim}$ in $v_{A,g}$ and then estimate the velocity at this frequency from the analytical solution to the phase velocity. The group velocity dispersion curve shown in FIG. 6b shows a clear perturbation at around 175 kHz·cm, so for this synthetic data $f_{lim}$=175 kHz·cm, whereby $v_{P,a}$=2600 m/s.

Figure 7A:
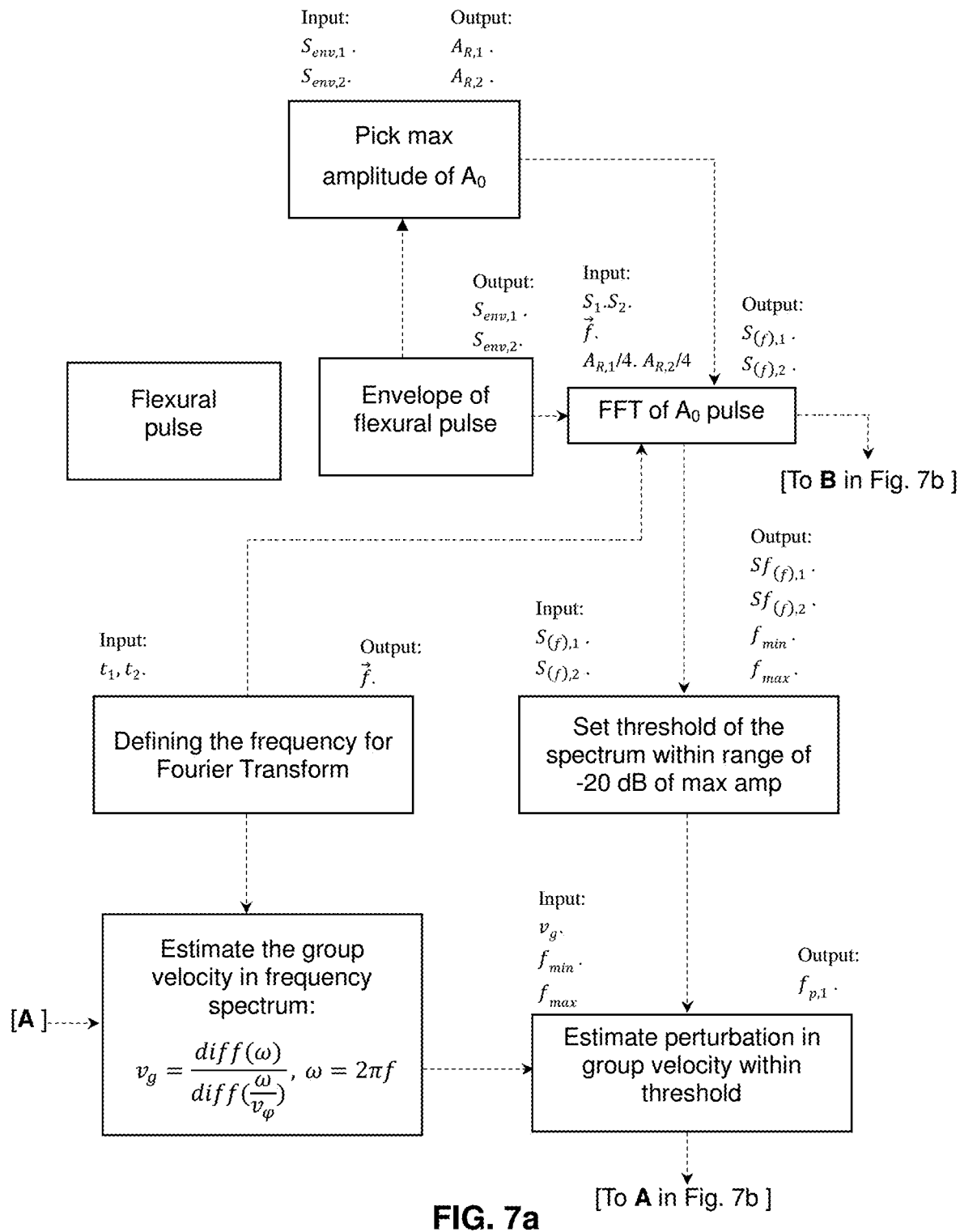
FIG. 7 is a generic flowchart showing the principal processing operations to estimate the P-wave velocity of the annulus material from the flexural wave excited in the casing.
Figure 7B:
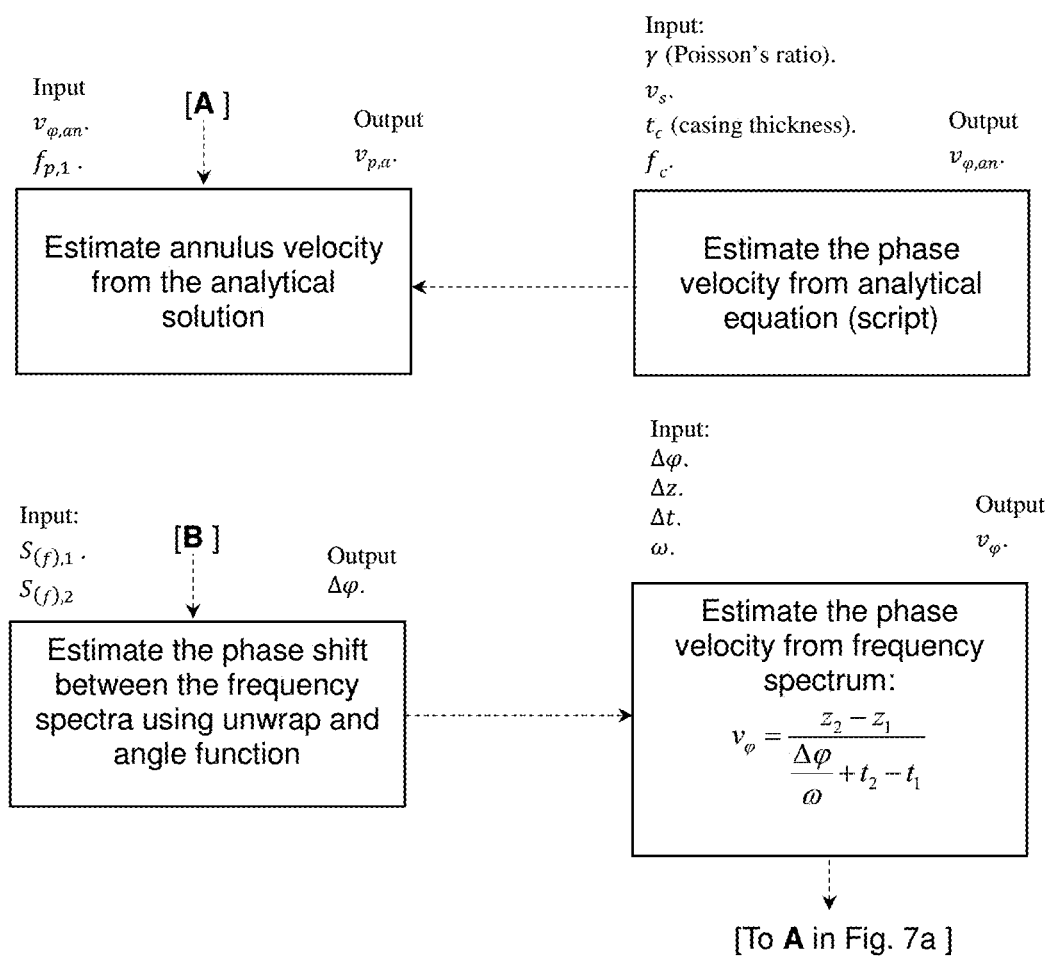

FIG. 7 is a generic flowchart that describes the processing to estimate the P-wave velocity of the annulus material from the flexural wave excited in the casing. The flowchart starts with the input of the flexural wave and knowledge of the pipe/plate and the center frequency of the transmitted pulse. The final output is a velocity estimate of acoustic waves propagating through domain 2.

Analyzing the Frequency Dependency of the Attenuation Dispersion

Figure 8A:
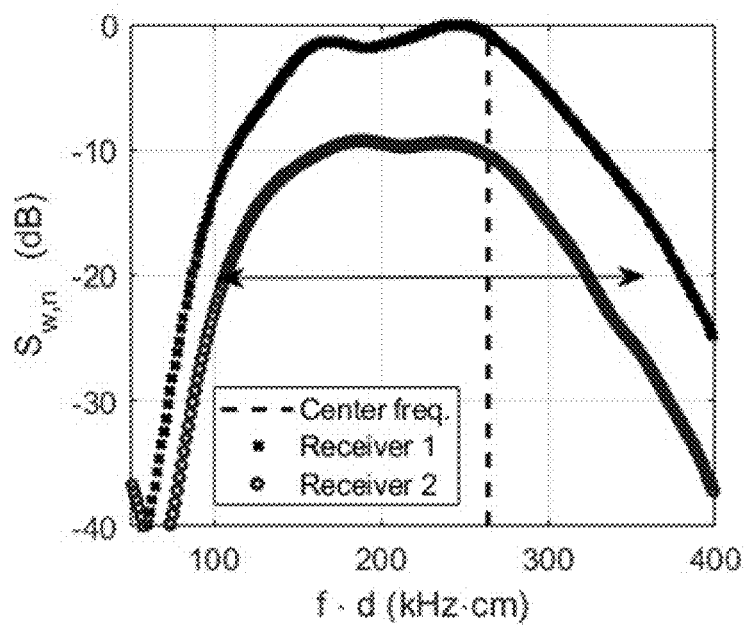
FIGS. 8a and 8b are graphical representations showing respectively the frequency spectrum of the flexural pulse received at two spaced apart receivers and the subsequent attenuation dispersion from propagating in the casing the distance between the receivers.
Figure 8B:
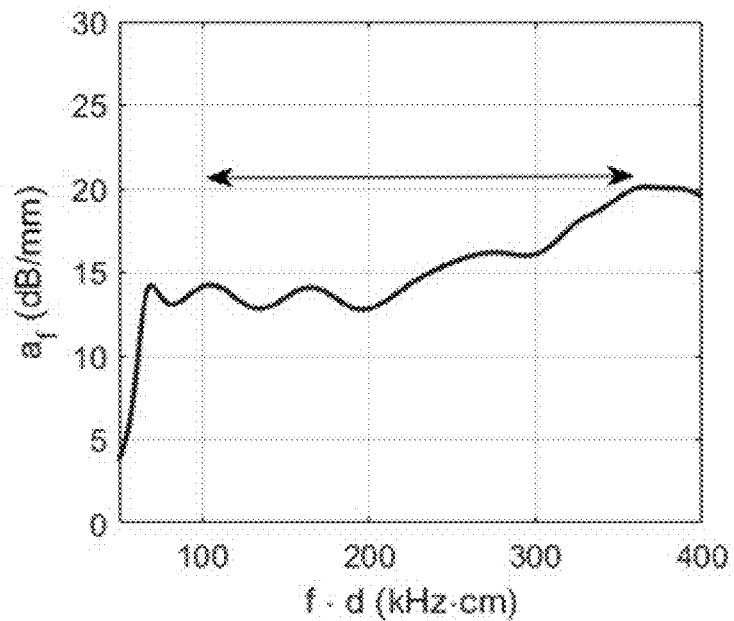

The system including at least two receivers may, however, also be used to compute the attenuation dispersion of the flexural wave. From the frequency spectrum measured at each receiver and shown in FIG. 8a, one can estimate the attenuation at different frequencies. This attenuation can be calculated by dividing the spectrum $S_{w,n}$ by the spectrum at the first receiver $S_{w,1}$, performing a decibel conversion on the quotient, and then dividing this quotient by the distance between the receivers:

$$\alpha_{(f)} = \frac{-20\log_{10}\left\{\left|\frac{S_{w,n}}{S_{w,1}}\right|\right\}}{z_n - z_1} \quad (2)$$

where $\alpha_{(f)}$ is the attenuation in frequency domain. In FIG. 8b, the attenuation is plotted against the frequency. Outside the area covered by the double arrow is where the signal level is low and likely dominated by noise. For fluids as the annulus material, the attenuation is quite constant. This behavior appears to hold for most fluids, while the attenuation tends to increase with increasing frequency for bonded solids. The data presented is laboratory data with epoxy with 5% tungsten mixed in. The laboratory setup and measurements on epoxy is presented by the inventor in a PhD thesis [5], which will be submitted shortly after filing the present application. It is noted that while the PhD thesis supplements what is described herein and provides more detailed theoretical understanding, an understanding of the theory is not essential to carrying out the invention, whose implementation is fully described herein without the need for further description and not all of whose features are related to in the PhD thesis.

Figure 9:
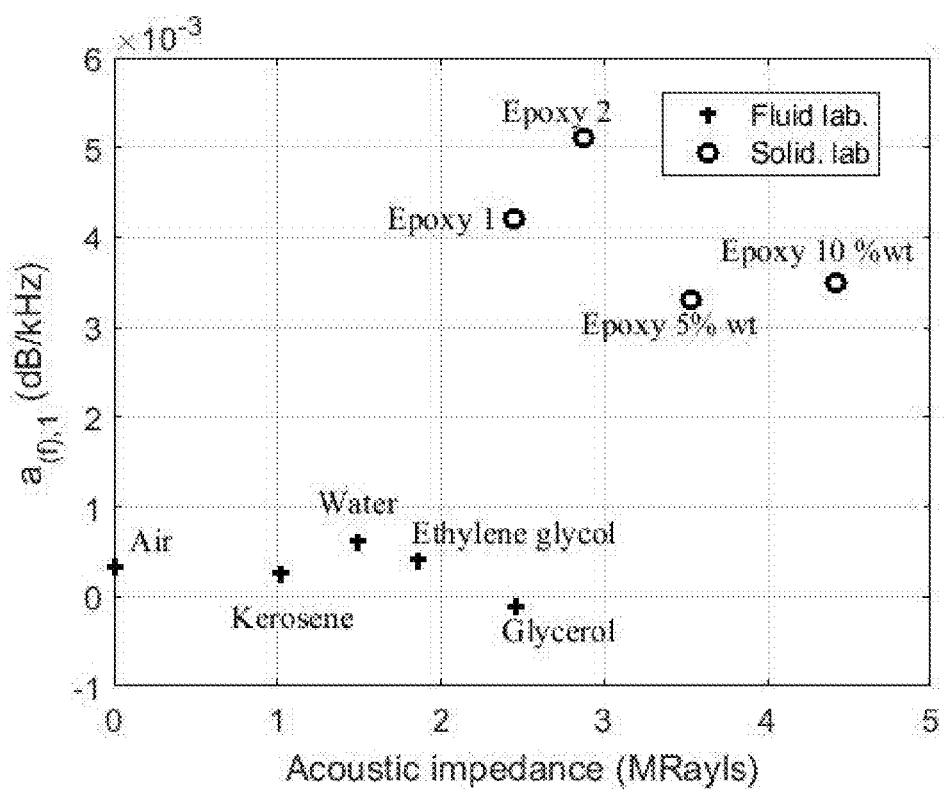
FIG. 9 is a generic flowchart showing the principal analysis method according to the invention.

The attenuation dispersion curve presented in FIG. 8b can be quantified by using least squares to estimate a linear fitted line ($L_{a_{(f)}}$) to the behavior over the frequency:

$$L_{a_{(f)}} = a_{(f),0} + a_{(f),1}C + a_{(f),2}C^2 + \quad (3)$$

where $C = f \cdot d$ and $L_{a_{(f)}}$ is expressed in dB/cm. $a_{(f)}$ is the linear regression coefficient in dB/kHz, which is plotted in FIG. 9. Specifically, the ordinate in FIG. 9 shows the linear regression coefficient for various different solids and fluids, their values being denoted by the symbols 'o' and '+', respectively. It is seen that solids have a tendency to increase the attenuation when the frequency is increasing. In effect, if we ignore the terms in $C^2$ and higher powers, which are negligible, this computes a straight line having gradient $a_{(f),1}$ that best-fits the attenuation dispersion curve. If the gradient is close to zero, this means that the attenuation is constant and the material behind the partition in Domain 2 is a fluid. If the gradient is greater than zero by a predetermined threshold e.g. $2 \cdot 10^{-3}$ db/kHz, this is indicative of the material being a solid.

It is not fully understood how the coupling of shear waves for solids affect the attenuation behavior in the frequency domain. We believe it is a combination of a P-wave velocity approaching a threshold value (1,800 m/s) and the coupling of shear waves, although reduction of the invention to practice does not require a theoretical understanding of the actual mechanism. Nevertheless, a solid material with a P-wave velocity below 1,800 m/s deep in the ground is uncommon. The opposite statement can be made about fluids: it is very rare that a fluid has a P-wave velocity above 1,800 m/s deep in the ground as evidenced by the simple fact that fluids tends to be more mixed with particles which makes them more dense which results in a reduced velocity. If the P-wave velocity for a fluid is in the range of 2,100-2,800 m/s, we believe this event would increase $a_{(f)}$. Therefore this effect is not necessarily restricted to a solid, but rather the P-wave velocity of the annulus material.

Figure 10:
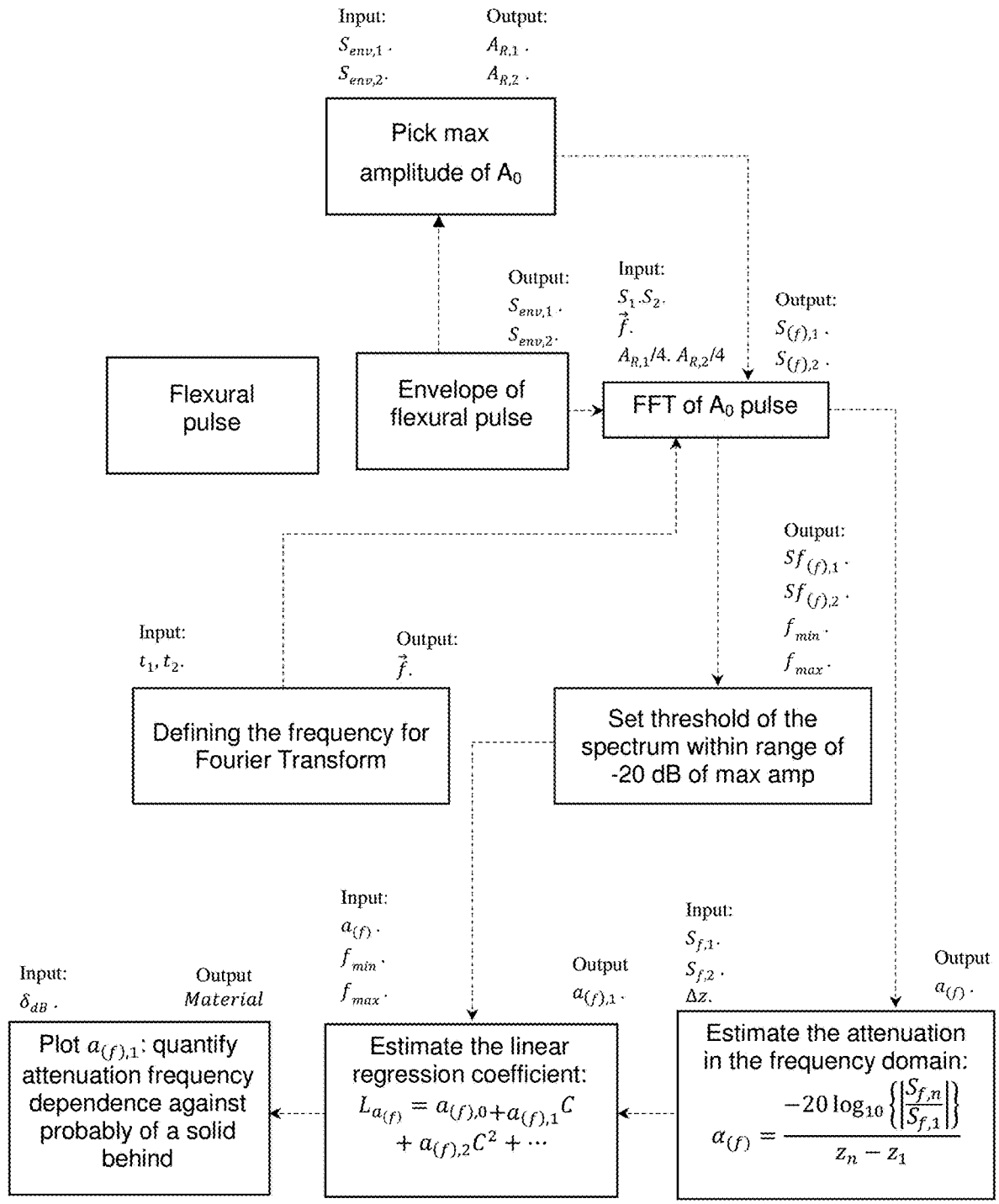
FIG. 10 is a generic flowchart showing the principal processing operations to estimate the linear regression coefficient between the flexural waves excited in the casing.

FIG. 10 shows a generic flowchart to describe the processing to estimate $a_{(f)}$ between the flexural waves excited in the casing. The flowchart starts with the input of the flexural wave and knowledge of the distance between the receivers. The final output is parameter to quantify the frequency dependence of the attenuation.

It should be noted that modifications may be made to both the method and system as described without departing from the scope of the invention as claimed in the appended claims. In particular, it is noted that while the invention has been described with particular reference to evaluating a material on the outside of a pipe or casing buried in the ground, the invention may find more general application for discriminating between two different materials on opposite sides of a partition. This may be useful for evaluating whether liquid is present in a pipe used to transport liquid, thus allowing a blockage in the pipe to be detected. More generally, the partition does not need to be constituted by the wall of a cylindrical casing or pipe and can be any sheet material having disparate materials on opposing surfaces thereof.

The invention has been described primarily with regard to a method because the hardware is known per se. When used to monitor oil wells, the transmitter and receivers must be inserted into a hollow casing sunk in the ground that is possibly hundreds of meters deep. Since the distances between adjacent receivers must be known, the transducers are installed into an elongated unit that is then lowered into the casing. This also allows the transducers to be tilted at known angles of incidence and reflection although more advanced transducers are available where the wave angle can be adjusted electronically. However, when applied to other situations where the transducers are more accessible, they may be spaced apart discretely at known intervals.

It should also be noted that features that are described with reference to one or more embodiments are described by way of example rather than by way of limitation to those embodiments. Thus, unless stated otherwise or unless particular combinations are clearly inadmissible, optional features that are described with reference to only some embodiments are assumed to be likewise applicable to all other embodiments also.

It will also be understood that the processing may be performed by a suitably programmed computer. Likewise, the invention contemplates a computer program being readable by a computer for executing the method of the invention. The invention further contemplates a machine-readable memory tangibly embodying a program of instructions executable by the machine for performing the method of the invention.

The invention claimed is:

1. A method for evaluating a material on a remote side of a partition separating a first domain from a second domain, the method comprising:
    disposing at least one ultrasonic transmitter and a plurality of ultrasonic receivers in longitudinally spaced-apart relationship along a first side of the partition in the first domain;
    activating the at least one ultrasonic transmitter to propagate a transmitted signal that hits the partition at an oblique incidence and excites, inside the partition, ultrasonic waveforms that comprise propagated quasi leaky-Lamb waves constituting an extensional wave and a flexural wave having respective symmetric and antisymmetric zero-order modes within the partition, wherein the spaced-apart receivers record the ultrasonic waveforms;
    processing the recorded ultrasonic waveforms to determine a measured phase velocity of the flexural wave propagating through the second domain on the second side of the partition from a longitudinal position of a first receiver to a longitudinal position of a second receiver that is located more remote from the transmitter than the first receiver and whose separation from the first receiver is known;
    computing a theoretical phase velocity of the flexural wave propagating through the second domain; and
    establishing that the second domain contains a solid if the measured phase velocity deviates from the theoretical phase velocity by an amount that is not accountable by noise alone;
    wherein establishing that the second domain contains a solid comprises:
    processing the recorded ultrasonic waveforms to calculate the group velocity of the flexural wave propagating through the second domain;
    identifying a perturbation in the group velocity plot when group velocity is plotted in the frequency domain and identifying a first critical frequency at which the perturbation occurs; and
    comparing the theoretical phase velocity at the first critical frequency to a predetermined threshold to determine if the second domain contains a liquid or a solid.

2. The method of claim 1, wherein calculating the group velocity of the flexural wave propagating through the second domain includes (i) obtaining the frequency spectrum of the flexural wave; (ii) estimating from the frequency spectrum a phase angle between respective flexural waves extracted from the ultrasonic waveforms recorded by adjacent receivers; and (iii) calculating the group velocity of the flexural wave propagating through the second domain from the phase angle.

3. The method according to claim 2, wherein the phase angle is estimated from a portion of the frequency spectrum where an amplitude of the flexural wave exceeds a predetermined minimal signal strength that eliminates the effect of noise.

4. Method The method according to claim 1, wherein identifying the perturbation in the group velocity of the flexural wave comprises performing the identifying within a frequency range where an amplitude of the flexural wave exceeds a predetermined minimal signal strength that eliminates the effect of noise.

5. The method according to claim 1, wherein identifying the perturbation in the group velocity comprises (i) computing a group velocity dispersion curve, and (ii) identifying a perturbation exceeding a predefined magnitude of deviation from the group velocity dispersion curve.

6. The method according to claim 1, wherein establishing that the second domain contains a solid comprises:
   identifying a deviation in a measured phase velocity curve when the measured phase velocity is plotted in the frequency domain and identifying a second critical frequency at which the deviation occurs;
   determining the computed phase velocity at the second critical frequency; and
   comparing the computed phase velocity to a predetermined threshold to determine if the second domain contains a liquid or a solid.

7. The method according to claim 1, wherein the partition comprises a casing and an annular fill installed in a borehole traversing a formation.

8. Method according to claim 1, wherein each transmitter and receiver is directed toward the partition at an angle of incidence close to 30°.

9. A computer program product comprising a non-transient computer readable medium storing program code instructions, which when executed on at least one processor that receives as input data representative of the recorded ultrasonic waveforms from a pair of spaced apart receivers, carries out the processing and computing operations of claim 1.

10. A method for evaluating a material on a remote side of a partition separating a first domain from a second domain, the method comprising:
   disposing at least one ultrasonic transmitter and a plurality of ultrasonic receivers in longitudinally spaced-apart relationship along a first side of the partition in the first domain;
   activating the at least one ultrasonic transmitter to propagate a transmitted signal that hits the partition at an oblique incidence and excites inside the partition guided ultrasonic waveforms that comprise propagated quasi leaky-Lamb waves constituting an extensional wave and a flexural wave having respective symmetric and antisymmetric zero-order modes within the partition, wherein the spaced-apart receivers record the ultrasonic waveforms;
   processing the recorded guided ultrasonic waveforms to determine a measured phase velocity of the flexural wave propagating through the second domain on the second side of the partition from a longitudinal position of a first receiver to a longitudinal position of a second receiver that is located more remote from the transmitter than the first receiver and whose separation from the first receiver is known;
   computing a theoretical phase velocity of the flexural wave propagating through the second domain; and
   establishing that the second domain contains a solid if the measured phase velocity deviates from the theoretical phase velocity by an amount that is not accountable by noise alone; wherein establishing that the second domain contains a solid comprises:
   identifying a deviation in the measured phase velocity curve when the measured phase velocity is plotted in the frequency domain and identifying a critical frequency $f_{lim}$ at which the deviation occurs;
   determining the computed phase velocity at the critical frequency; and
   comparing the computed phase velocity to a predetermined threshold to determine if the second domain contains a liquid or a solid.

11. A computer program product comprising a non-transient computer readable medium storing program code instructions, which when executed on at least one processor that receives as input data representative of recorded ultrasonic waveforms from a pair of spaced apart receivers, carries out the processing, computing, determining, and comparing operations of claim 10.

* * * * *